(12) United States Patent  
Bouteille et al.

(10) Patent No.: US 6,450,198 B1  
(45) Date of Patent: Sep. 17, 2002

(54) MINIATURE SOLENOID VALVE, AND METHODS OF MANUFACTURING IT

(75) Inventors: Daniel Bouteille, Viroflay; Patrick Muller, Villez sous Bailleul; Philippe Rodrigues, Arnieres sur Iton, all of (FR)

(73) Assignee: Parker Hannifin Rak SA, Annemasse Cedex (FR)

( * ) Notice: Subject to any disclaimer, the term of this patent is extended or adjusted under 35 U.S.C. 154(b) by 0 days.

(21) Appl. No.: 09/712,196

(22) Filed: Nov. 15, 2000

(30) Foreign Application Priority Data

Nov. 24, 1999 (FR) .............................................. 99 14775

(51) Int. Cl.$^7$ ............................................ F15B 13/044
(52) U.S. Cl. .................................. 137/596.17; 137/870
(58) Field of Search .............................. 137/596.17, 870

(56) References Cited

U.S. PATENT DOCUMENTS

| | | |
|---|---|---|
| 3,303,854 A | 2/1967 | Churchill |
| 3,559,686 A | 2/1971 | Hoffman |
| 3,823,736 A | 7/1974 | Vanti |
| 4,791,960 A | * 12/1988 | Ellison .................. 137/596.17 |
| 4,889,164 A | 12/1989 | Hozumi et al. |
| 5,535,783 A | 7/1996 | Asou et al. |

FOREIGN PATENT DOCUMENTS

FR      1198043      12/1959

* cited by examiner

*Primary Examiner*—Gerald A. Michalsky  
(74) *Attorney, Agent, or Firm*—Birch, Stewart, Kolasch & Birch, LLP

(57) ABSTRACT

A miniature solenoid valve comprising:

a valve body;

an electromagnet having a yoke secured to the body and a plunger core movable relative to the yoke along a longitudinal axis of the electromagnet;

a pneumatic chamber formed in the body adjacent to the end of the plunger core that faces away from the yoke, into which chamber there opens out freely a first duct and, each via a respective seat, second and third ducts, with the openings of the second and third ducts facing in opposite directions and being coaxial about the longitudinal axis of the electromagnet; and first and second valve members facing the two seats respectively with clearance, the first valve member being carried by the plunger core and the second valve member being carried by moving equipment held in contact with the plunger core so as to be moved therewith, in which the two seats are provided at respective ends of a single seat-carrier piece which includes internally the ends of the second and third ducts, said piece being engaged in the body of the valve along the common axis of the electromagnet and the two seats, and being immobilized in a precise position along said axis and specific to each valve.

18 Claims, 6 Drawing Sheets

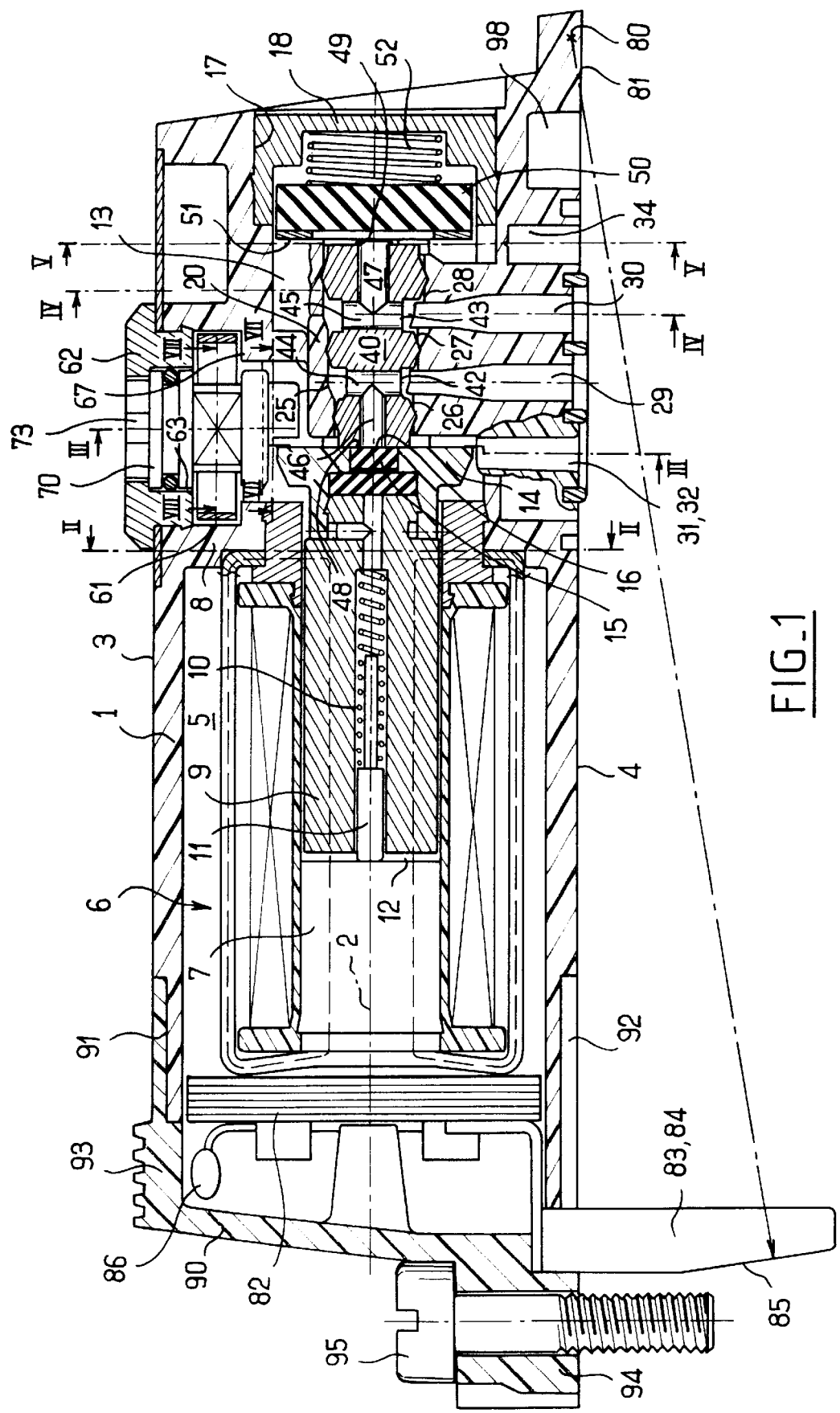
FIG_1

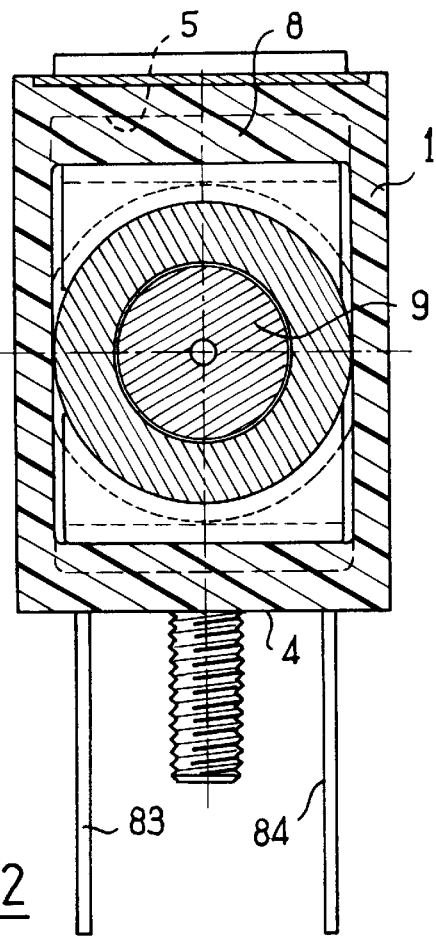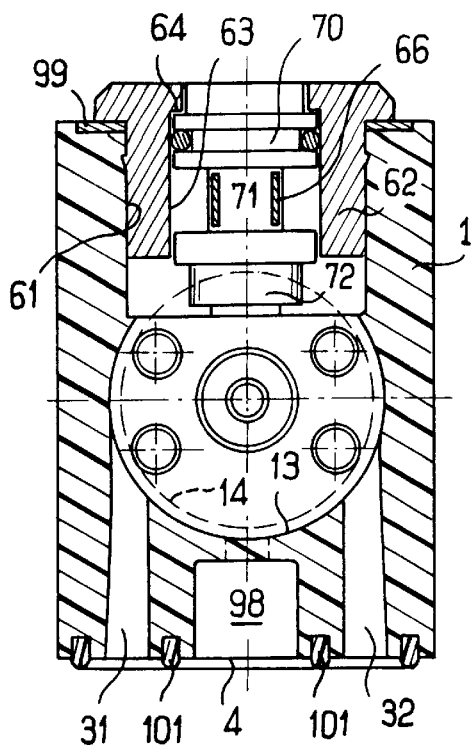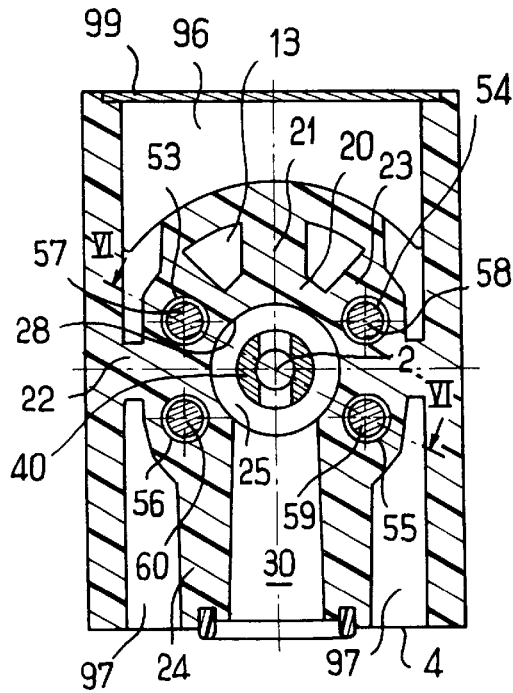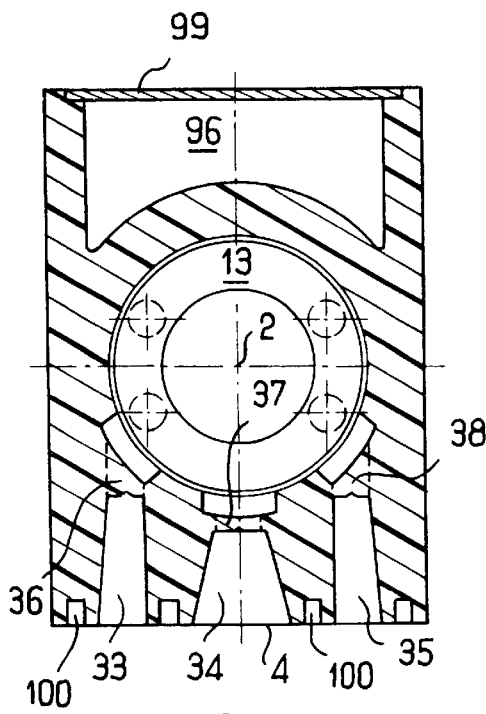

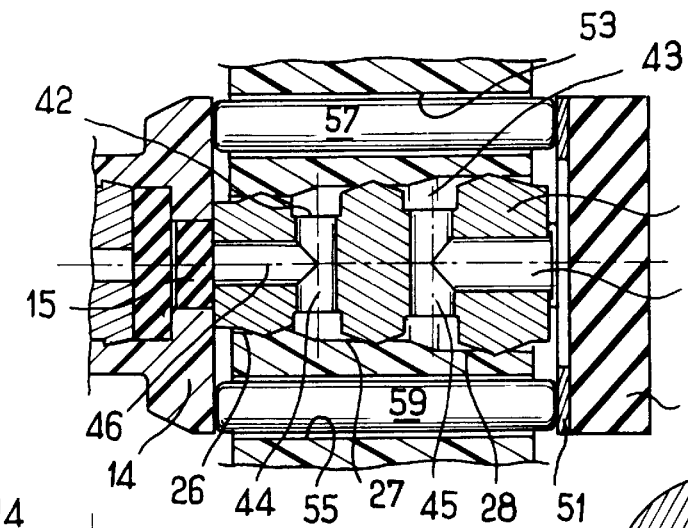
FIG_6
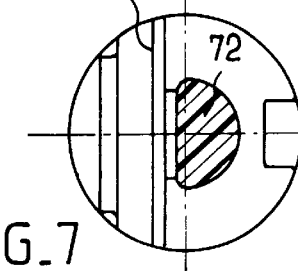
FIG_7
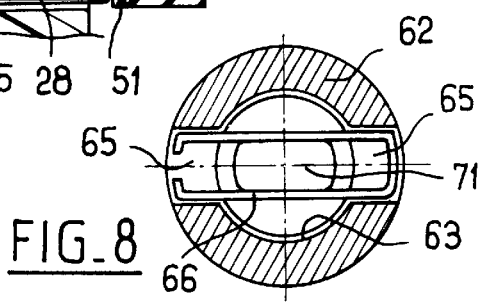
FIG_8
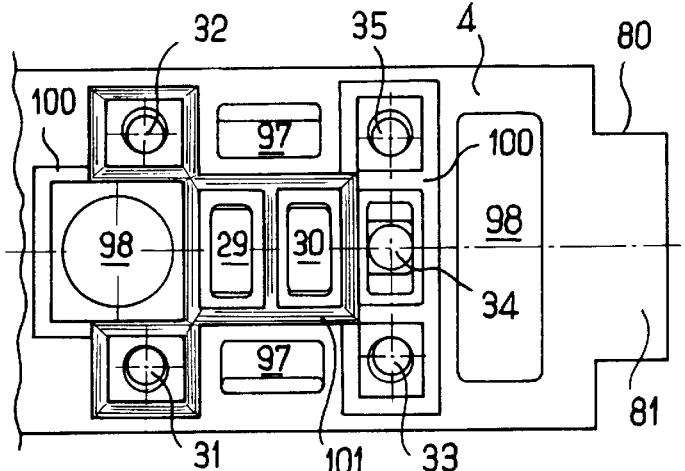
FIG_9A
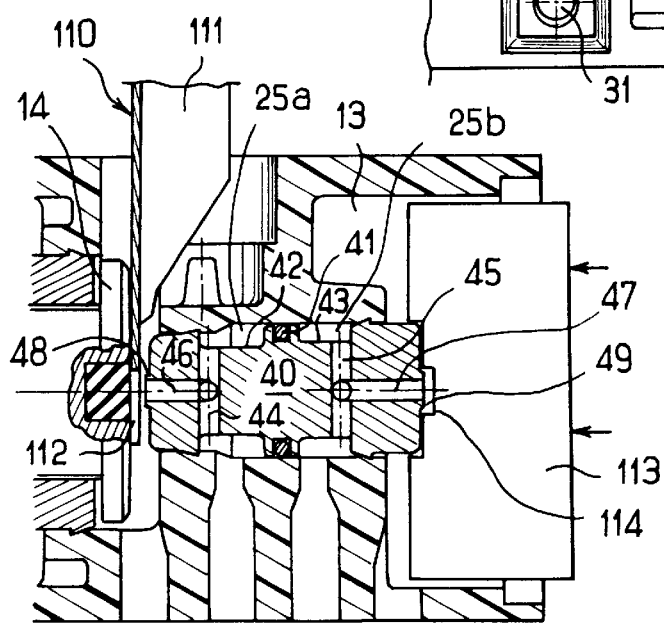
FIG_12

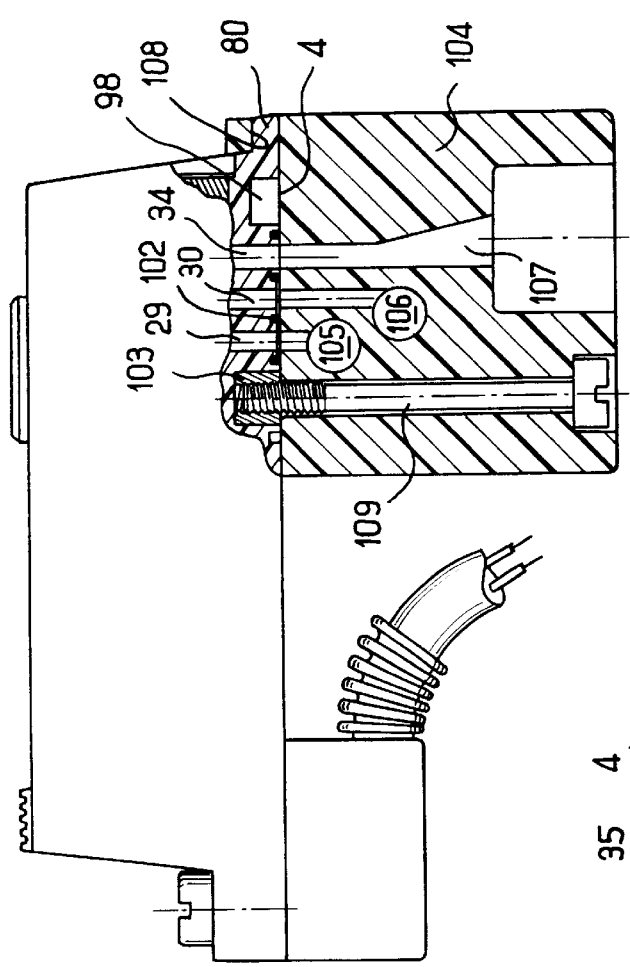
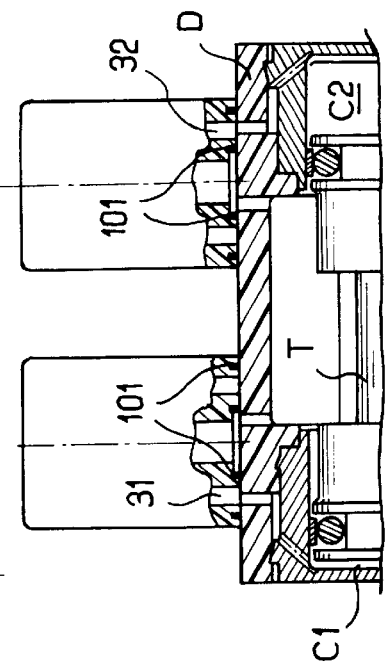
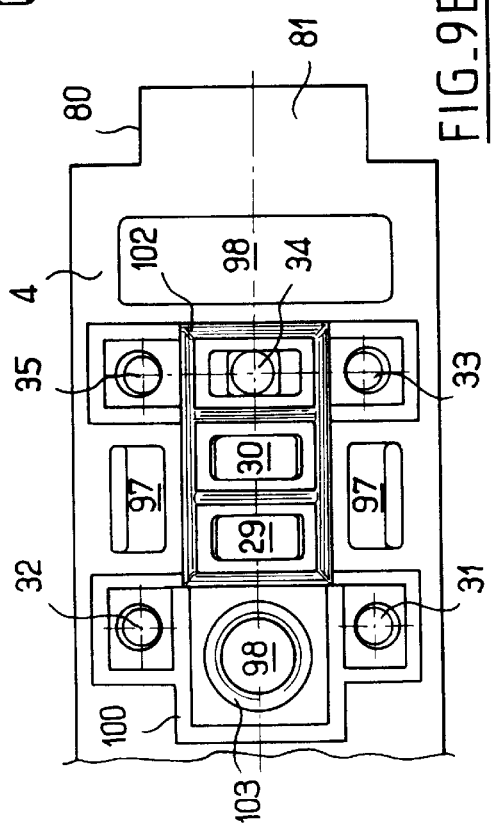
FIG_10
FIG_11
FIG_9B

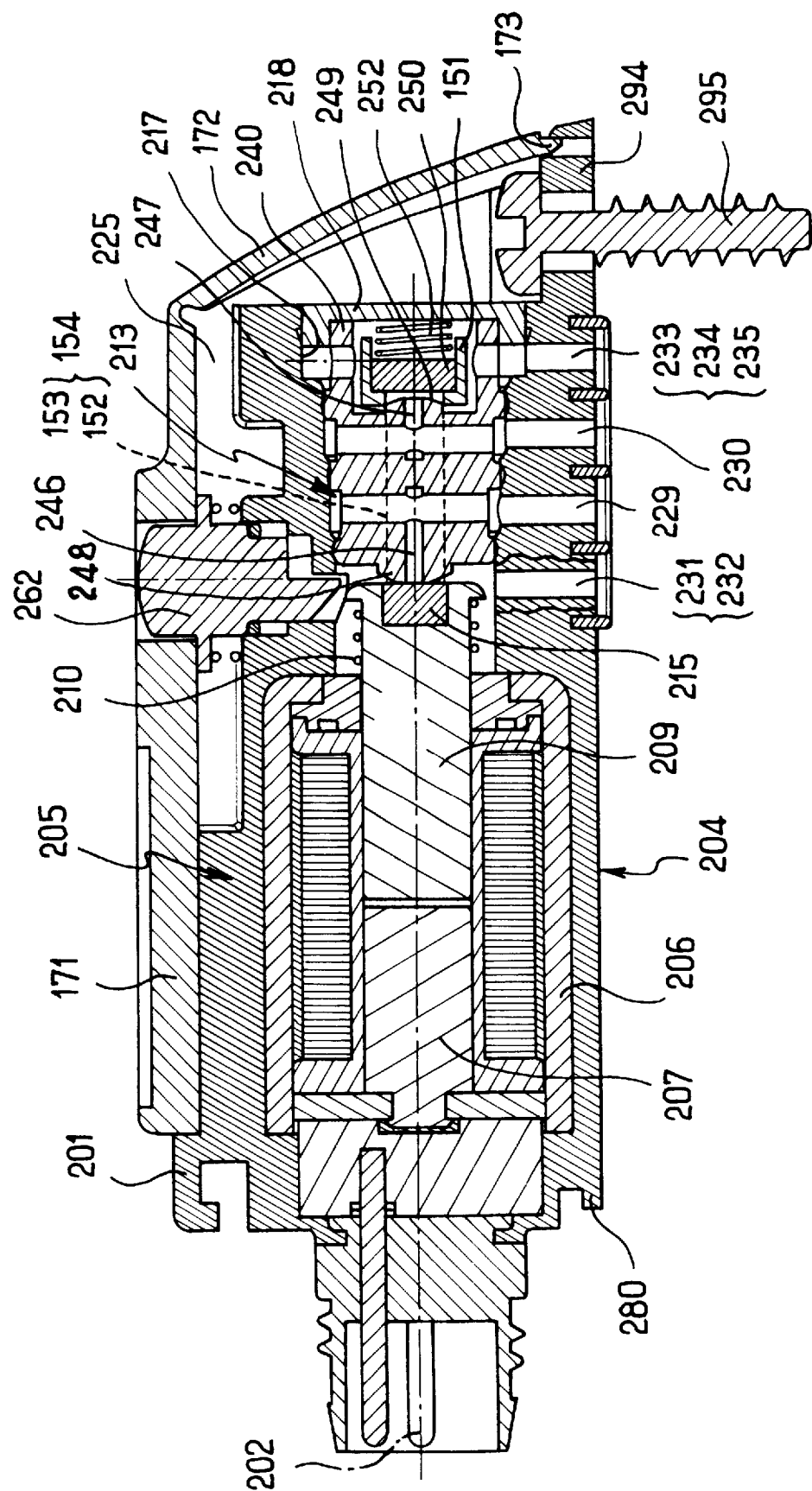
FIG_13

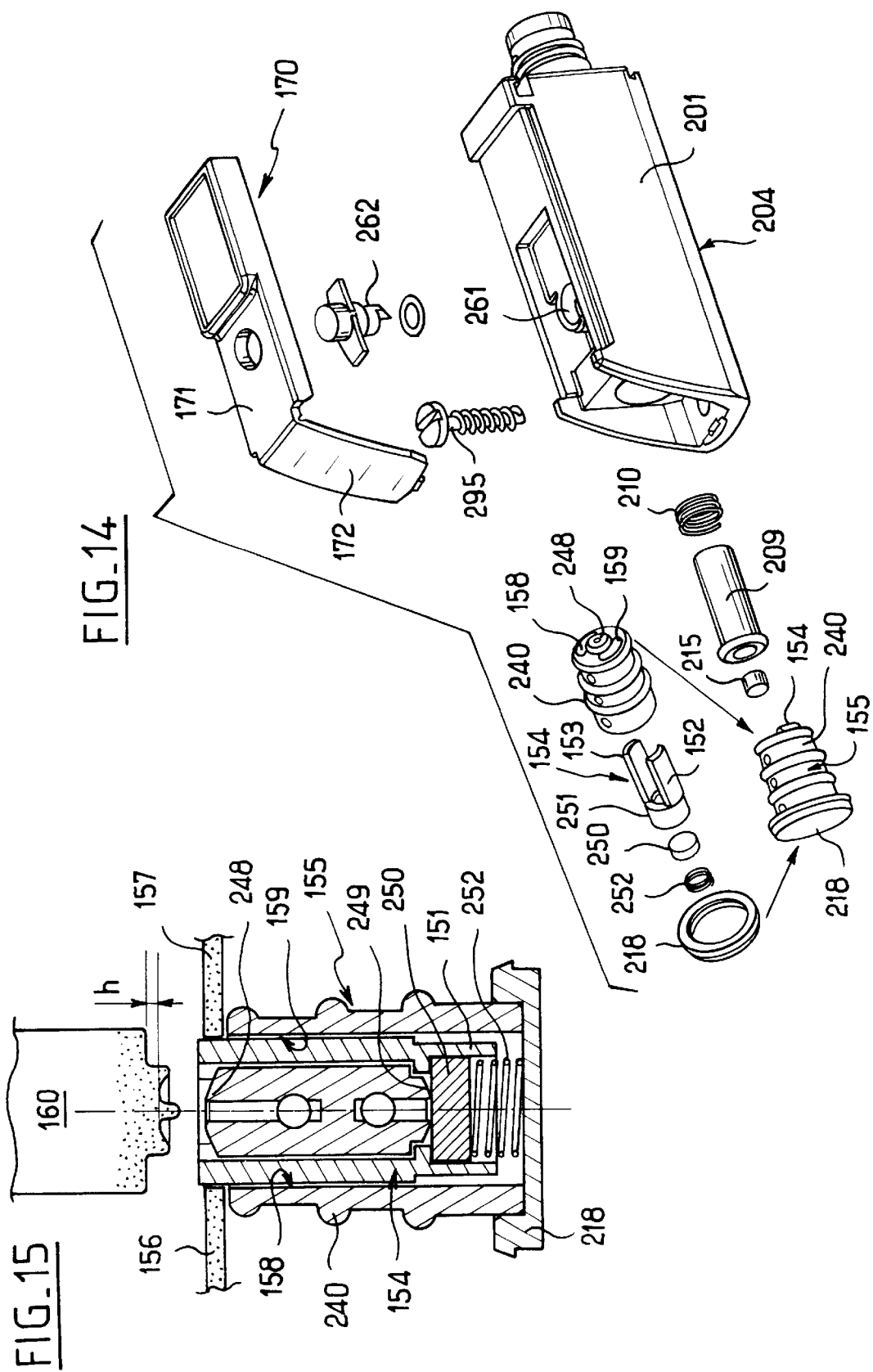

MINIATURE SOLENOID VALVE, AND METHODS OF MANUFACTURING IT

The present invention relates to a miniature solenoid valve (electrically-controlled pneumatic valve) whose design opens up the possibility of manufacturing methods that are of low cost and that guarantee high quality performance.

BACKGROUND OF THE INVENTION

Progress in pneumatic automation is associated with miniaturization of the components used, and in particular of the solenoid valves that pilot directional control valves. Thus, over the last few years, manufacturers have gone from solenoid valves having a smallest dimension greater than 20 mm to valves in which said dimension is down to 10 mm. Nevertheless, manufacturing a valve of such small size requires solutions that are expensive but which enable only poor performance to be achieved because of difficulties encountered in obtaining precision dimensions for the parts making up the functional elements, and because of difficulties in the procedures for assembling them so as to obtain quality that is constant from one valve to another. Reducing dimensions has the effect of reducing fluid flow sections and thus of reducing the pneumatic power available at the outlet from the solenoid valve, and it is found in many cases that the sum of manufacturing tolerances and assembly tolerances on the functional parts of a valve of such dimensions is of the same order of magnitude as one of the dimensions of the flow sections.

Furthermore, electromagnetically, very little power can be fed to such devices because the winding is highly miniaturized. The working stroke of the plunger core of the electromagnet for driving the valve member(s) is then very short.

As a result of these constraints, it is necessary for the component parts of the valve to be manufactured with very great care and/or for the assembly procedure to be complex, including precise and individual adjustment of each valve, thereby penalizing cost price. In this respect, mention can be made of document FR 2 643 370 which illustrates one of those expensive technological solutions.

For the record, mention is also made of various other documents such as DE 2 340 304, DE 1 871 835 U, DE 4 125 816, US 3 303 854, and FR 1 198 043 all of which describe solenoid valves of structure similar to that of the invention, but not adapted to being miniaturized on an industrial scale and at acceptable cost.

OBJECTS AND SUMMARY OF THE INVENTION

The present invention seeks to remedy those drawbacks by proposing a solenoid valve of structure that is simple to manufacture and assemble, thereby giving rise to a significant reduction in cost, with manufacture being constant in quality, and with it being possible to obtain pneumatic power that is greater than required merely for piloting a directional control valve.

Another object of the invention which is achieved by the very design of the valve is to constitute a member for controlling small actuators directly. Such small actuators consume pneumatic fluid at rates which require internal flow sections in the members controlling them that correspond to a diameter of about 1 mm, which is much greater than the flow section required for controlling a directional control valve.

To this end, the invention provides a miniature solenoid valve comprising:

a valve body;

an electromagnet having a yoke secured to the body and a plunger core movable relative to the yoke along a longitudinal axis of the electromagnet;

a pneumatic chamber formed in the body adjacent to the end of the plunger core that faces away from the yoke, into which chamber there opens out freely a first duct and, each via a respective seat, second and third ducts, with the openings of the second and third ducts facing in opposite directions and being coaxial about the longitudinal axis of the electromagnet; and first and second valve members facing the respective seats with clearance, the first valve member being carried by the plunger core and the second valve member being carried by moving equipment held in contact with the plunger core by a resilient return member so as to be moved together with the plunger core between a first position corresponding to the electromagnet being in the excited state in which the plunger core is in abutment against the yoke, and a second position corresponding to the absence of electromagnetic excitation in which the first valve member bears against its seat, the two seats being provided at respective ends of a single seat-carrier piece which includes internally the ends of the second and third ducts, said piece being engaged in the body of the valve along the common axis of the electromagnet and the two seats, and being immobilized in a precise position along said axis and specific to each valve.

This first disposition is what makes it possible industrially to ensure proper positioning of the seats relative to the stroke of the electromagnet and in particular relative to the most effective portion of said stroke, as can be seen from the description below.

In a first embodiment, the above-mentioned equipment has a set of spacers extending between the valve members, outside said seat-carrier piece, the length of the spacers being equal to the distance between the two seats plus the length of the stroke desired for each of the valve members. Insofar as the material of the second valve member is deformable, it can be preferable for the face of the second valve member facing its seat to be surmounted by a peripheral washer for bearing against the spacers, the length of the spacers being shortened to compensate by an amount equal to the distance between the bearing surface for the spacers and the surface of the active portion of the valve member.

This structure ensures that the pneumatic stroke is well controlled, with control depending on the relationship between the dimensions of the seat-carrier piece and of the spacers. By choosing to make these members out of a metal and to fabricate them by machining (with an automatic lathe), they can be obtained at relatively low cost with dimensions that are very precise. In addition, direct contact is eliminated between the metal spacers and the valve members which are necessarily made of a deformable elastomer-based material, avoiding any embedding of the spacers into the surface of the elastomer material since, in operation, that gives rise to randomness in the size of the stroke which it is desired to keep constant, and also to randomness in the relative positioning of the moving elements, particularly if the pilot forces or the resistive forces to be overcome by the valve members vary. It will be observed that this washer introduces an additional tolerance to be kept under control in order to define the pneumatic stroke, but that this is not a problem since the way the washer is fabricated (cutting) means that tight tolerances can be complied with.

In order to change the stroke, i.e. in order to change the internal flow section of the valve, only the seat-carrier piece needs to be changed, so the same control is achieved over precision, regardless of the chosen section.

In a second embodiment, the seat-carrier piece and the moving equipment are made of thermoplastic material implemented in the form of a preassembled cartridge comprising: said piece, the moving equipment with the second valve member, a stopper added to the seat-carrier piece beside the second valve member, and a resilient return member placed between the stopper and the second valve member; the moving equipment being formed by a fork of thermoplastic material comprising a cup for holding the second valve member and integrally extended by at least two longitudinal branches parallel to the above-mentioned common axis, passing through the seat-carrier piece and having free ends situated on either side of the seat situated facing the first valve member.

It will be observed that under such circumstances, the pneumatic stroke is determined during manufacture of the cartridge and in simple manner, as described below.

One of the numerous advantages of this structure lies in the fact that in a single solenoid valve body as used for implementing a standard interface with external devices, it is possible to install seat-carrier pieces of different fluid flow sections and of different lengths in order to define different strokes that match the desired flow rates, thus making it possible for the manufacture of valves of different calibers to be extremely standardized. In this context, it is recalled that in order to maintain a flow section between seat and valve member for given duct diameter, it is necessary for the stroke of the valve member to be equal to one-fourth of the diameter. It will thus be understood that if it is desired to double the flow diameter, and thus double the stroke, an increase in caliber requires only that the stroke be increased by a value equal to one-fourth of the smaller caliber diameter, and that it is easy to provide a pneumatic chamber in the valve body (e.g. made of plastic) where the chamber has the same dimensions for all calibers capable of containing the maximum stroke, with the parameters that govern how the stroke is determined being achieved by parts that are independent of the valve body and that are fitted thereto.

Among other features of the invention that are described below, mention is made of the feature whereby the seat-carrier piece is a body of revolution provided on the outside with three spike means that are axially spaced apart from one another for fixing the piece in the body of plastics material, and two outer grooves between the spike means forming sections of the second and third ducts between their terminal portions formed inside the piece and their portions formed inside the body, said sections being isolated from each other and from the pneumatic chamber. This piece is assembled to the valve body inside the pneumatic chamber merely by forcing one into the other. This, together with the fact that the portion of the body forming the side wall of the pneumatic chamber is provided with an orifice that opens out firstly into the zone of the chamber containing the nearest seat of the valve and secondly to the outside surface of the body opposite from the surface for receiving a manual control member, leads to a first method of manufacturing the valve that is particularly easy while nevertheless making it possible to obtain all of the precision that is required for a high quality solenoid valve that operates reliably.

In order to manufacture a solenoid valve having a seat-carrier piece and moving equipment that are made of metal and turned, the method consists, when assembling the valve, in inserting a piece of shim via the lateral orifice for housing the manual control member prior to the manual control member being installed, the shim being placed in front of the electromagnet and being of a thickness that is equal to the stroke desired for the valve members, in forcing the seat-carrier piece into the pneumatic chamber by means of a tool inserted via the end opening thereof prior to the stopper being put into place until the plunger core of the electromagnet is brought into abutment against its yoke, and in withdrawing the piece of shim. It is thus ensured that the stroke of the valve members corresponds with precision to the most effective stroke of the electromagnet, i.e. the stroke that comes closest to a zero airgap, thus providing better certainty that operation will take place properly at low power or low pneumatic flow rate, while also making it possible to implement high power variants (i.e. at high flow rate) when they are necessary.

In this respect, it is recalled that for given excitation power, the force developed by the electromagnet increases as the plunger core comes closer to the yoke, and thus makes it possible to overcome better the forces due to the pneumatic pressure acting on the section of the seats. Unfortunately, these forces depend on the section of the seat and thus vary as a function of the desired flow rate, such that for a given electromagnet, the opposing forces it needs to overcome differ depending on the intended application of the solenoid valve. The assembly method outlined above serves to guarantee a manufacturing procedure that puts the electromagnet in its best operating condition, whatever the purpose to which the valve would be put in the future, and thus regardless of the length of the stroke of the valve members.

To manufacture solenoid valves in which the seat-carrier piece and the moving equipment are prepared as a cartridge, the invention provides a second method which consists in assembling the cartridge, in calibrating the axial distance measured between the free ends of the branches of the fork and the seat situated facing the first valve member and in proceeding with controlled forced engagement of the cartridge into the body of the valve until accurate spacing is obtained between the first valve member and its seat when the plunger core is bearing against the yoke.

In this case, said calibration is performed by partially melting the seat and the ends of the branches of the fork by means of a shaping tool pressed hot against the corresponding end of the cartridge.

Finally, and preferably, in order to obtain the said precise spacing, a reference level of power is fed to the electromagnet while the cartridge is being forced into the body of the valve, the reference level of power tending to attract the plunger core against the yoke, and the application of force is stopped when the first valve member is observed to separate from its seat.

BRIEF DESCRIPTION OF THE DRAWINGS

Other characteristics and advantages of the invention appear from the description of a preferred embodiment thereof and given below by way of example.

Reference is made to the accompanying drawings, in which:

FIG. 1 is a longitudinal section view of a first embodiment of a solenoid valve of the invention;

FIG. 2 is a section view on line II—II of FIG. 1;

FIG. 3 is a section view on line III—III of FIG. 1;

FIG. 4 is a section view on line IV—IV of FIG. 1;

FIG. 5 is a section view on line V—V of FIG. 1;

FIG. 6 is a fragmentary section view on line VI—VI of FIG. 4;

FIG. 7 and FIG. 8 are detail views on sections VII—VII and VIII—VIII of FIG. 1;

FIGS. 9A and 9B are two views of the underside of the FIG. 1 valve level with its pneumatic chamber;

FIGS. 10 and 11 are diagrams showing two possible ways in which the valve of the invention can be associated, in FIG. 10 with a directional control valve and in FIG. 11 with a link block;

FIG. 12 shows an assembly method of the invention with a variant embodiment of the seat-carrier piece;

FIG. 13 is a longitudinal section view of a second embodiment of the solenoid valve of the invention;

FIG. 14 is an exploded view of the main component parts of the solenoid valve; and FIG. 15 shows the principle implemented for calibrating the pneumatic stroke of the valve.

MORE DETAILED DESCRIPTION

The solenoid valve shown in FIGS. 1 to 12 comprises an elongate body 1 with a general axis 2, the body being generally in the form of a rectangular parallelepiped, and thus having a cross-section that is substantially rectangular. Externally, the body has four side surfaces, including a top surface 3, and a bottom surface 4 parallel to the axis 2 and forming the installation surface of the valve. It is hollow to form two main sections. A first section 5 receives a solenoid or electromagnet 6 having a frame, a coil, and a yoke 7, which are fixed to an end wall 8 of the hollow section 5.

In conventional manner, the electromagnet possesses a plunger core 9 slidably mounted in a cylindrical housing running on from the yoke 7. A spring 10 received in the plunger core 9 and acting on a piston 11 bearing against the end surface of the yoke 7 urges the plunger core away from the yoke in the absence of excitation. When the electromagnet is excited, the magnetic forces involved overcome the effect of the spring 10 and press the end 12 of the plunger core 9 against the end wall of the yoke 7 (zero airgap).

The end of the plunger core opposite from its surface 12 penetrates into a second hollow section 13 of the body 1 which forms the pneumatic chamber of the solenoid valve. This end is fitted with a plate 14 which is secured thereto by spike means, which plate 14 has a central portion made of an elastomer material to constitute a first valve member 15 of the valve. The valve member 15 enclosed between the end of the core 9 and the plate 14 has been leveled so that its surface 16 facing towards the chamber 13 is flush with the radially extending surface of the plate 14. The recess in the body 1 constituting the chamber 13 opens out via a large opening 17 in the longitudinal end of the body 1 remote from its end that receives the electromagnet. This opening 17 is closed in definitive manner as described below by means of a stopper 18, preferably made of metal and fixed by spike means in the opening 17.

Inside the pneumatic chamber 13, there is a central core 20 on the axis 2 which is connected to portions of the body 1 surrounding said chamber by radial walls such as 21, 22, 23, and 24 (FIG. 4), the wall 24 being relatively thick and relatively wide and extending substantially perpendicularly to the installation surface 4.

The core 20 has a cylindrical central recess 25 on the axis 2, and more exactly made up of three staged cylindrical sections 26, 27, and 28, the smallest diameter section 26 being the closest to the valve member 15. In addition, the thick wall 24 has two ducts 29 and 30 each having one end opening out into the recess 25 and each having its opposite end opening out to the outside of the body 1 through the installation surface 4.

In addition, the body 1 has two other ducts 31 and 32 which form alternative branches of a single functional duct, disposed symmetrically to each other about a plane perpendicular to the face 4 and containing the axis 2 (the plane of FIG. 1), these ducts 31 and 32 opening to the outside of the body 1 through the installation surface 4 and having their opposite ends opening out into the chamber 13. These ducts 31 and 32 are situated in a common plane extending transversely to the valve.

Beyond the ducts 29 and 30, the body 1 has the beginnings of ducts 33, 34, and 35 likewise situated in a common plane extending transversely to the body, and level with the portion of the chamber 13 that is closest to the stopper 18, these beginnings of ducts extending perpendicularly to the installation surface 4 and being separated from the chamber 13 by respective end walls 36, 37, and 38, each of which is in the form of a thin wall that can be pierced for certain uses of the valve. The resulting ducts form alternatives to the ducts 31 and 32 for various given functional circuits, as explained below. Under such circumstances, the ducts 31 and 32 would be left in the form of beginnings of ducts, whereas they are shown in the figures as being pierced.

The valve includes a functional piece 40 received as a force-fit in the recess 25 of the core 20 in the chamber 13, said piece 40 being substantially cylindrical in shape and, in the embodiment shown in FIGS. 1 and 6, having an outside surface which includes three annular spike means for co-operating with the sections 26, 27, and 28 of the recess 25 in order to hold the piece 40 therein. In the variant shown in FIG. 12, firstly the recess 25 has only two staged cylindrical sections, and secondly the piece 40 has only two annular spike means for co-operating with each of the cylindrical sections of the recess 25, respectively. Between the two spike means, the piece 40 carries an O-ring 41 which provides sealing between the two portions 25a and 25b of the recess 25 as defined by the O-ring 41 between the spike means.

Between the spike means, or between the spike means and the O-ring, the piece 40 possesses two outer grooves 42 and 43 into which two transverse ducts 44 and 45 open out respectively. A respective axial duct segment 46 or 47 extends from each of these transverse ducts and opens out into the adjacent axial end face of the piece 40. Around each open end, each of the axial faces of the piece 40 possesses a small bead 48, 49 that forms a seat against which a valve member can be pressed, and in particular the valve member 15 can be pressed against the seat 48 that faces the electromagnet.

A second valve member 50 is mounted in the chamber 13 facing the axial end of the piece 40 that carries the seat 49. The valve member 50 is likewise made of an elastomer material. Insofar as this elastomer material is not sufficiently hard, the valve member 50 is surmounted on its face facing towards the seat by a metal washer 51 covering its periphery. Between the valve member 50 and the stopper 18 there is a spring 52 urging the valve member 40 towards the seat 49, but doing so with force that is much lower than that of the spring 10 acting via the core 9 to press the valve member 15 against the seat 48.

Orifices 53, 54, 55, and 56 are formed in the radial walls 22 and 23, and the orifices slidably receive spacers 57, 58, 59, and 60. These spacers are parallel to the axis 2 and of a length such that with the valve members urged continuously towards each other under drive from the spring 52, the spacers keep the valve members spaced apart by a distance measured between the active surfaces thereof, i.e. between their central surface zones which co-operate with the seats, that is equal to the axial length of the piece 40 plus the stroke desired for the valve members. In other words, the length of the spacers is greater than the axial length of the piece 40 by a length that would be equal to said stroke if the valve member 50 did not have the metal washer 51, as could indeed be the case if the material from which the valve members is made is of sufficient hardness to enable it to withstand being indented by the spacers during the lifetime of the valve. When the washer 51 is present, then this value is itself shortened by the thickness of the washer 51 in order to compensate.

The portion of the body 1 between the chamber 13 and the top surface 3 has an orifice 61 whose main function is to receive a manual control for the valve. This orifice 61 receives a cylindrical insert 62 provided with external spike means for securing it when it is forced into the orifice 61 which presents a cylindrical bore 63 having a top shoulder 64, the end of the insert 62 being provided with a diametral slot 65 receiving a resilient pin 66. This resilient pin 66 rests on a bottom shoulder 67 of the orifice 61.

Inside the bore 63, there is received a cam member 70 that turns in leakproof manner inside the bore 63 beneath the shoulder 64 and that includes a flat 71 through which the pin 66 passes. Beneath this portion 71, the member 70 is extended by a cam 72 which, in the angular orientation imparted thereto by the pin 66, is spaced apart from the peripheral portion of the radial surface of the plate 14 and which, when the member 66 is turned in the bore 63, against the resilient return force of the pin 66, comes in contact with the plate so as to push back the moving core of the electromagnet towards its yoke. This member 70 can be turned because of a slot 73 that is accessible from the outside of the valve and that can receive a tool such as a screwdriver. This manual control can also be performed in a variant that is not shown merely by a pushbutton with a camming slope that penetrates into the chamber 13 against force from a return spring so as to push back the plate 14.

Beside its end having the stopper 18, the body 1 has an axial extension 80 forming a bottom lug suitable for being slid into a housing provided for this purpose on a directional control valve or on a link block that is to receive the solenoid valve. The bottom surface 81 of the lug 80 is coplanar with the installation surface 4 of the valve.

At its other end, the body 1 contains such electrical or electronic circuitry 82 as is required for exciting the coil of the electromagnet and for protecting it against surges, which circuitry has input and output terminals constituted by two pins 83 and 84 in the form of teeth extending substantially perpendicularly to the installation surface 4 and having an end profile 85 in a plane parallel to the plane of FIG. 1 which is substantially in the form of an arc of a circle centered in the vicinity of the lug 80. This profile facilitates engagement and disengagement of the valve on or from female terminals carried by a connector associated with the directional control valve or the link block to which the solenoid valve is fixed. The natural movement for installing the solenoid valve consists in initially inserting the lug 80 into the housing that is to receive it while the solenoid valve slopes downwards slightly towards said housing, and then to cause the valve to tilt about the hinge point constituted by the lug received in the housing so as to plug the valve in electrically.

Finally, the body 1 has a covering endpiece or cap 90 that is also made of plastics material and that is secured by adhesive together with a force-fit or cold bonding in a setback 91 provided on the outside surface of the body 1. The cover includes slots 92 in its engagement portion for placing astride the pins 83 and 84. It could also have a transparent top portion 93 through which it is possible to see a light emitting diode (LED) 86 forming part of the circuit 82. Finally, the cap can be provided with an end tab 94 for receiving a fixing screw 95.

The technique whereby the body 1 is manufactured by injection requires that massive portions of injected plastics material be kept to a minimum. That is why the body 1 has various external recesses forming setbacks such as those referenced 96, 97, and 98 in the figures. The recess 96 can be covered by a cover plate 99 secured to the body by the insert 62 forming part of the manual control, while one of the recesses 98 can advantageously receive a metal insert having one or two tapped orifices forming fixing means as an alternative to the lug 80 or to the screw 95.

The installation surface 4 has a groove 100 extending around each of the outlets of the ducts 29, 30, 31, 32, 33, 34, and 35 so as to provide sealing in the connection between said orifices and complementary orifices provided on the body of the directional control valve or the link base. Depending on whether or not the beginnings of ducts 31, 32, 33, 34, and 35 are put into service, the particular shape flat gasket that is chosen to provide the sealing will vary.

Thus, FIG. 9A shows a gasket 101 which isolates the orifices 39, 30, 31, and 32. In FIG. 10, which is a fragmentary diagrammatic section, it can be seen that on a directional control valve D, the spool or slide T is piloted by two solenoid valves of the invention, one having its duct 31 connected to a pilot chamber C1 and the other having its duct 32 connected to a pilot chamber C2. The installation surfaces of the solenoid valves are fitted with respective gaskets 101 (FIG. 9A) and the beginnings of ducts 33, 34, and 35 are not pierced.

FIG. 9B shows a gasket 102 having a different configuration, and it also shows the setback 98 fitted with a tapped insert 103. The gasket 102 surrounds the orifices 29, 30, and 34, isolating them, with the orifice 34 communicating with the chamber 13 by a hole through its end wall 37 (FIG. 5). The ducts 31 and 32 in this case are left as beginnings of ducts, as are the beginnings of ducts 33 and 35. This use of the solenoid valve is illustrated by FIG. 11. The valve is connected to a link base 104 that has a pressure channel 105, a common exhaust 106, and an outlet 107. The valve is fixed to the base by the lug 80 co-operating with a housing 108 that the base includes for this purpose, and by a screw 109 co-operating with the insert 103.

FIG. 12 is a diagram showing the method of installing the seat-carrier piece 40 inside the chamber 13 and thus inside the housing 25 for its central core 20. At this stage in the assembly of the valve, the plunger core 9 of the electromagnet is already in its housing together with the valve member 15, inside the chamber 13. The pneumatic portion of the valve, i.e. the portion on the right in FIG. 1, has still not received its manual control, thus making it possible to insert a piece of shim 110 into the chamber 13 transversely to the axis 2, the active portion of the shim being in the form of a fork 112 which is extended by a handle portion 111, the function of the fork being to prevent the seat 48 bearing directly against the shim and being damaged by such contact. The thickness of the branches of the fork is equal to the desired stroke plus the height of the projection formed by the seat 48 relative to the terminal face of the piece 40 carrying it. By means of a thrust tool 113, once the shim 110 has been put into place, the piece 40 is inserted by force into the housing 25. As it penetrates, the piece 40 comes into contact with the shim 110, and pushes it towards the yoke of the electromagnet, thus taking with it the plunger core against the force of the spring 10 until the core comes into abutment against the yoke. At this moment, the piece 40 is accurately positioned, and the positions of the seats 48 and 49 are optimized to benefit from the working stroke of the electromagnet. It will be observed that the thrust tool 113 has a centered recess 114 in its driving surface so as to avoid damaging the bead 49 that forms the seat for the valve member 50.

To terminate assembly of the valve, it suffices to install the spacers 57 to 60 in their orifices, followed by the washer 51, the valve member 50, and the spring 52, after which the orifice 17 is closed by the stopper 18 having spike means. Finally, assembly is terminated by installing the manual control member.

A variant of this method of installing the seat-carrier piece 40 inside the chamber 13 consists in acting as follows. Before the piece 40 is inserted by means of the tool 113, the spacers 57 to 60 are put into place in the housings 53 to 56 formed through the radial walls 22 and 23. Thereafter, the piece 40 is driven by the tool 113 so as to penetrate until the tool comes into abutment against the spacers 57 to 60 and until the spacers are themselves prevented from moving in translation by the core 9 which has itself come into abutment against the yoke 7. The thrust plane of the spacers against the tool 113 is identical to that containing the seat 49 so that when penetration is stopped, the piece 40 is precisely in the desired position for optimizing the stroke of the electromagnet. Compared with the method using a piece of shim, this variant has the advantage of avoiding the need to use any shim since the piece of shim required is small in size and therefore fragile and it is difficult to extract after the seat-carrier piece 40 has been pushed home.

The operation of such a solenoid valve is described briefly. The duct 29 communicates with a source of pressure via the directional control valve or via the member on which the solenoid valve is fitted. When the electromagnet is not excited, the spring 10 presses the valve member 15 against the seat 48 and pushes back the valve member 50 against the action of the spring 52 by means of the spacers 57 to 60. The duct 31, 32 which is freely open into the chamber 13 thus communicates with the duct 30 which is connected, for example, to a common exhaust collection duct via the chamber 13, the duct 47 which opens out therein through the uncovered seat 49, the duct 45, and the groove 43.

When the electromagnet is excited, the core is quickly and cleanly urged against the yoke 7, thereby enabling the spring 52 to push back the moving equipment formed by the valve member 50, the washer 51, and the spacers 57 to 60. The valve member 50 thus closes communication between the duct 47 and the chamber 13, so the pressure duct 44 is then opened to the chamber 13 and the pressure from the duct 29 penetrates into the duct 31, 32. Pressure thus reaches a pilot chamber of the directional control valve having the solenoid valve fitted thereto thus enabling it to change state, or else pressure reaches some other member that the solenoid valve is to feed. When the electromagnet 6 ceases to be excited, the pilot chamber or said other member is then purged because it is connected to exhaust since the spring 10 of the electromagnet changes over the communications inside the chamber 13.

The embodiment of the solenoid valve of the invention shown in FIGS. 13 and 14 comprises for the most part elements as described above and now given the same reference numerals plus 200. Thus, it has a body 201 that is elongate along a general axis 202, that is generally in the form of a rectangular parallelepiped, and therefore has a cross-section that is substantially rectangular. Externally, the body has a bottom surface 204 parallel to the axis 202 and forming the installation surface of the valve. It has two main sections. A first section 205 is overmolded onto an electromagnet 206 that comprises a frame, a coil, and a yoke 207. The plunger core 209 is moved away from the yoke by a spring 210 in the absence of excitation. The end of the plunger core remote from the yoke penetrates into the second section 213 of the body 201 which contains the pneumatic chamber of the valve. This end is fitted with a first valve member 215 of the valve. The recess in the body 201 constituting the chamber 213 opens out via a large opening 217 at one of the longitudinal ends of the body 201, and specifically its end remote from the end containing the electromagnet. The pneumatic chamber 213 has a cylindrical central recess 225 on the axis 202 and formed as in the above-described embodiment by three staged cylindrical sections. Similarly, two ducts 229 and 230 open out into the recess 225 via one end each, while their other ends open out to the outside of the body 201 through the installation surface 204.

The ducts 231 to 235 have the same role as the ducts 31 to 35 of the preceding figures.

The valve includes a functional piece 240 received as a force-fit in the recess 225 of the chamber 213, said piece 240 being substantially cylindrical in shape with an outside surface that carries three sets of annular spike means for co-operating with the recess 225 so as to retain the piece 240 therein.

As in the preceding embodiment, the piece 240 possesses two outside grooves between its spike means and into which two transverse ducts open out respectively. Respective axial duct segments 246 and 247 extend from each of these transverse ducts to open out into the axial end faces of the piece 240. Each of the axial faces of the piece 240 forms a seat 248, 249 around said open end and a corresponding valve member can bear against said seat, i.e. the valve member 215 bears against the seat 248 which faces the electromagnet.

The second valve member 250 is mounted facing the seat 249. Between the valve member 250 and a stopper 218, there is a spring 252 urging the valve member 250 towards the seat 249, but with force that is much less than that of the spring 210 urging the valve member 215 against the seat 248.

In this variant embodiment, the second valve member 250 is received in an open-bottomed cup 151 that is extended by two spacer-branches 152 and 153, the cup and the branches together forming a fork 154. The branches 152 and 153 pass freely through the piece 240 on either side of its internal ducts so that the free ends of the branches are close to the seat 248 adjacent to the valve member 215. These branches perform the same role as the spacers of the preceding variant, and their length is adjusted accordingly.

In an advantageous variant of this second embodiment, the moving equipment constituted by the fork 154 and the valve member 250, the spring 252, the seat-carrier piece (insert) 240, and the stopper 218 is preassembled to form a cartridge 155 as shown in FIGS. 14 and 15. It can be seen in these figures that the fork and the spring are held engaged in the insert 240 by the stopper 218 which is secured by any suitable means to the insert. Specifically, the valve member 250 is pressed against the seat 249.

One of the advantages of this variant lies in making the pieces 240 and 154 by (injection) molding plastics material. This leads to a cost of fabrication that is much lower than when fabrication is performed by turning as described above, but this is to the detriment of the dimensional precision of the pieces. However, as described above, dimensional precision is essential in order to obtain good operating performance from the valve.

To remedy that, the assembled cartridge 155 is adjusted as shown in FIG. 15. This adjustment is performed in suitable tooling and consists in locking the fork 154 relative to the insert 240 (e.g. by means of jaws 156, 157 which press the branches 152, 153 of the fork against the inside surfaces of the through orifices 158, 159 in which they are received), and then a shaping tool 160 is applied to shape both the seat 248 of the insert 250 and the ends of the branches 152, 153. This tool can be of any appropriate kind. Nevertheless it is preferably implemented in the form of a hot punch and it performs shaping by partially melting the two pieces with which it comes into contact under determined pressure and for a determined length of time.

This ensures that each cartridge has an axial offset of a precise value between the free ends of the branches 152, 153 and the seat 248, which value is equal to the dimension referenced h in FIG. 15 at the nose of the tool, said dimension corresponding exactly to the desired pneumatic stroke.

The cartridge 155 then forms a unit which is inserted into the section 213 of the body 201 by being forced into the bore 225. During this controlled insertion, the fork comes to bear against the end of the core 209, and retracts so that the seat 248 comes into contact with the valve member 215. Continued insertion thus causes the core 209 to move towards the yoke 207. It has been found that by powering the electromagnet at a determined voltage, the core can be attracted against the yoke so as to achieve a determined size of airgap. The reference voltage is thus established so as to ensure that this value corresponds to the stroke desired for the core. Insertion of the cartridge is thus stopped at the moment when the core is attracted to the yoke when the electromagnet is powered at the reference voltage. A simple signal indicative of this sudden attraction can be the pressure which is established in the ducts 231, 232 (when the duct 129 is connected to a pressure source) due to the valve member 215 moving off the seat 248.

The body 201 is provided with an orifice 261 whose main function is to receive a manual control 262 for the valve, that acts on the core 209 in the manner described above.

Various other details can be observed that distinguish this variant embodiment from the preceding embodiment:

in this case the lug 280 is situated at the electromagnet end;

the tab 294 is integral with the body 201 and is situated at the "pneumatic" end of the valve; it receives a self-tapping fixing screw 295; and the valve is capped by a single piece 170 including a portion 171 designed to be snap-fastened on the body 201 and a flap 172 hinged to the portion 171 to cover the tab 294 and to snap-fasten thereto by means of a tongue 173 at its bottom free end.

What is claimed is:

1. A miniature solenoid valve comprising:

a valve body;

an electromagnet having a yoke secured to the body and a plunger core movable relative to the yoke along a longitudinal axis of the electromagnet;

a pneumatic chamber formed in the body adjacent to the end of the plunger core that faces away from the yoke, into which chamber there opens out freely a first duct and, each via a respective seat, second and third ducts, with the openings of the second and third ducts facing in opposite directions and being coaxial about the longitudinal axis of the electromagnet; and first and second valve members facing the respective seats with clearance, the first valve member being carried by the plunger core and the second valve member being carried by moving equipment held in contact with the plunger core by a resilient return member so as to be moved together with the plunger core between a first position corresponding to the electromagnet being in the excited state in which the plunger core is in abutment against the yoke, and a second position corresponding to the absence of electromagnetic excitation in which the first valve member bears against its seat, wherein the two seats are provided at respective ends of a single seat-carrier piece which includes internally the ends of the second and third ducts, wherein said valve body has a hollow core in the pneumatic chamber with a longitudinal axis aligned with said longitudinal axis of the electromagnet and wherein said seat-carrier piece is inserted by force into said core along said longitudinal axis towards said electromagnet until obtaining an accurate position of said seat-carrier piece relative to said plunger of the electromagnet.

2. A valve according to claim 1, wherein the moving equipment has a set of spacers extending between the valve members, outside said seat-carrier piece, the length of the spacers being equal to the distance between the two seats plus the length of the stroke desired for each of the valve members.

3. A valve according to claim 2, wherein the face of the second valve member facing its seat is surmounted by a peripheral washer for bearing against the spacers, the length of the spacers being shortened to compensate by an amount equal to the distance between the bearing surface for the spacers and the surface of the active portion of the valve member.

4. A valve according to claim 2, wherein the piece carrying the seats and the spacers are made of metal and are machined.

5. A valve according to claim 2, wherein said spacers form abutment means for limiting insertion of the seat carrier piece into the hollow care of the valve body.

6. A valve according to claim 1, wherein the moving equipment is formed by a fork of thermoplastic material, comprising a cup for supporting the second valve member and extended integrally by at least two longitudinal branches extending parallel to said common axis, the forks passing through the seat-carrier piece and having their free ends situated on either side of the seat situated facing the first valve member.

7. A valve according to claim 6, wherein the moving equipment and the seat-carrier piece, also made of thermoplastic material, are implemented in the form of a preassembled cartridge comprising said piece, the moving equipment with the second valve member, a stopper fixed on the seat-carrier piece adjacent to the second valve member, and a resilient return member placed between the stopper and the second valve member.

8. A valve according to claim 7, wherein the cartridge has a calibrated axial distance measured between the free ends of the branches of the fork and the seat situated facing the first valve member so that said fork forms abutment means for limiting said forced engagement of the cartridge into the valve body for obtaining accurate spacing between the first valve member and its seat when the plunger core is bearing against the yoke.

9. A valve according to claim 1, wherein the seat-carrier piece is a body of revolution provided on the outside with three spike means that are axially spaced apart from one another for fixing said seat-carrier piece in said hollow core, and two outer grooves between the spike means forming sections of the second and third ducts between their terminal portions formed inside the seat-carrier piece and their portions formed inside the body, said sections being isolated from each other and from the pneumatic chamber.

10. A valve according to claim 1, wherein the valve body is made of plastic material is provided with a plane outside surface for installation purposes extending parallel to said longitudinal axis and having a fixing tab at one end and a fastening lug at its other end.

11. A valve according to claim 10, wherein the valve body is fitted on its side remote from its installation surface with a snap-fastenable cap having a hinged flap for masking the fixing tab.

12. A valve according to claim 10, wherein the valve body is overmolded onto the stationary parts of the electromagnet and possesses a central recess open at its end remote from the electromagnet to form the pneumatic chamber and provided with a stopper that is fitted to the body in definitive manner.

13. A valve according to claim 12, wherein said hollow core in the pneumatic chamber, is connected to the remainder of the body via at least one wall extending substantially perpendicularly to the external installation surface and having the second and third ducts formed therein.

14. A valve according to claim 13, wherein the portion of the valve body forming the side wall of the pneumatic chamber is provided with a n orifice opening out firstly into the zone containing the seat that is closer to the electromagnet, and secondly to the outside surface of the body that is remote from the installation surface.

15. A valve according to claim 14, wherein said orifice is fitted with a manual control member having a finger for actuating the plunger core of the electromagnet and co-operating with the end thereof.

16. A valve according to claim 10, wherein said three ducts open to the outside of the body through the installation surface thereof.

17. A valve according to claim 16, wherein the first duct has two separate branches that are symmetrical to each other about a plane perpendicular to the installation surface and that contains the longitudinal axis of the valve body.

18. A valve according to claim 17, wherein the valve body possesses at least one beginning of an additional branch of the first duct, extending perpendicularly to the installation surface and having an end wall which constitutes a wall to be pierced in order to establish permanent communication between said beginning of a duct and the pneumatic chamber.

* * * * *